US012623574B2

(12) United States Patent   (10) Patent No.:   US 12,623,574 B2

Priestman et al.   (45) Date of Patent:   May 12, 2026

(54) VEHICLE SEAT FOR ACCOMMODATING A WHEELCHAIR

(71) Applicant: Priestman Goode Limited, London (GB)

(72) Inventors: Paul Priestman, London (GB); Nick Moyes, Wellington (NZ); Nigel Ian Smith, Bristol (GB)

(73) Assignee: Priestman Goode Limited, London (GB)

( * ) Notice: Subject to any disclaimer, the term of this patent is extended or adjusted under 35 U.S.C. 154(b) by 293 days.

(21) Appl. No.: 18/258,152

(22) PCT Filed: Dec. 13, 2021

(86) PCT No.: PCT/EP2021/085530

§ 371 (c)(1),
(2) Date: Jun. 16, 2023

(87) PCT Pub. No.: WO2022/128938

PCT Pub. Date: Jun. 23, 2022

(65) Prior Publication Data

US 2024/0051439 A1   Feb. 15, 2024

(30) Foreign Application Priority Data

Dec. 17, 2020   (GB) ...................................... 2019968

(51) Int. Cl.
*B60N 2/24*   (2006.01)
*A61G 3/08*   (2006.01)
*B60N 2/30*   (2006.01)

(52) U.S. Cl.
CPC ........... *B60N 2/245* (2013.01); *A61G 3/0808* (2013.01); *B60N 2/3045* (2013.01); *B60N 2/242* (2013.01); *B60N 2/3097* (2013.01)

(58) Field of Classification Search
CPC .................. B60N 2/245; B60N 2/3045; B60N 2002/363; B60N 2/3011; A61G 3/0808; B64D 11/0639
(Continued)

(56) References Cited

U.S. PATENT DOCUMENTS 4,103,934 A * 8/1978 Arnholt ................ A61G 3/0808
                                              410/23
4,266,822 A * 5/1981 Barecki .................... A61G 3/06
                                              244/118.6
(Continued)

FOREIGN PATENT DOCUMENTS

EP   1777100 A1   4/2007
EP   1864850 A1 * 12/2007   ............. B60N 2/015
(Continued)

OTHER PUBLICATIONS

Wikipedia; Image from "Folding seats in the Kauffman Stadium"; retrieved from https://en.wikipedia.org/wiki/Folding_seat#/media/File:BuckONeilLegacySeat2009.jpg on Jun. 14, 2023, pp. 1.
(Continued)

*Primary Examiner* — Jason S Morrow
(74) *Attorney, Agent, or Firm* — Stoel Rives LLP

(57)   ABSTRACT

A vehicle seat configured to be fixed in a vehicle is defined. The vehicle seat comprises a seat back configured such that when the seat is fixed in the vehicle there is a gap between a lower edge of the seat back and a floor of the vehicle to enable wheels of a wheelchair to protrude through the gap. The vehicle seat further comprises a seat base wherein the seat base is either: foldable between a first position in which the seat base acts as a base to the seat and a second position in which the seat base is stowed against the seat back; or
(Continued)

removable from the seat back. The seat base is foldable or removable to allow the seat base to be stowed when the seat is used by the wheelchair.

20 Claims, 11 Drawing Sheets

(58) Field of Classification Search
USPC ...................................................... 244/118.6
See application file for complete search history.

(56) References Cited

U.S. PATENT DOCUMENTS

| | | | | |
|---|---|---|---|---|
| 5,474,353 | A * | 12/1995 | Koester .................... | B60N 2/14 |
| | | | | 297/344.21 |
| 7,040,847 | B1 | 5/2006 | Cardona | |
| 7,819,468 | B2 * | 10/2010 | Tsuda ................... | B60N 2/3065 |
| | | | | 297/188.1 |
| 9,107,786 | B2 * | 8/2015 | Girardin ................. | B60R 22/24 |
| 10,953,987 | B2 * | 3/2021 | Johnson ............. | B64D 11/0691 |
| 11,117,500 | B2 * | 9/2021 | Hage-Hassan ......... | B60N 2/686 |
| 11,123,241 | B2 * | 9/2021 | Mori ...................... | B60N 2/245 |
| 11,712,380 | B2 * | 8/2023 | Girardin ................. | B60R 22/24 |
| | | | | 410/7 |
| 12,274,651 | B2 * | 4/2025 | Nishikawa ........... | A61G 3/0808 |
| 2006/0159542 | A1 * | 7/2006 | Ditch ................... | A61G 3/0808 |
| | | | | 410/7 |
| 2015/0224903 | A1 | 8/2015 | Mcdowell et al. | |
| 2020/0093662 | A1 * | 3/2020 | Mori .................... | B60N 2/3047 |
| 2021/0121341 | A1 * | 4/2021 | Girardin ................. | B60R 22/22 |
| 2021/0169714 | A1 * | 6/2021 | Goss .................... | A61G 3/0808 |
| 2023/0110338 | A1 * | 4/2023 | Brahic ................. | A61G 3/0808 |
| | | | | 701/2 |
| 2023/0172775 | A1 * | 6/2023 | Nishikawa ........... | A61G 3/0808 |
| 2023/0331125 | A1 * | 10/2023 | Smykowski ......... | B60N 2/3088 |
| 2024/0335046 | A1 * | 10/2024 | Lopes .................... | B60N 2/865 |

FOREIGN PATENT DOCUMENTS

| | | | | |
|---|---|---|---|---|
| EP | 1878609 | A2 | 1/2008 | |
| EP | 3628538 | A1 | 4/2020 | |
| GB | 2197628 | A | 5/1988 | |
| GB | 2197628 | B * | 1/1991 | .......... A61G 3/0808 |
| JP | 2010207561 | A | 9/2010 | |
| KR | 20120058322 | A | 6/2012 | |
| WO | 02091979 | A1 | 11/2002 | |
| WO | WO-2016011050 | A1 * | 1/2016 | .......... A61G 3/0808 |
| WO | WO-2019079060 | A1 * | 4/2019 | .......... A61G 3/0808 |

OTHER PUBLICATIONS

Wikipedia; Image from "Folding Seats on the London Underground 1995 Stock"; retrieved from https://en.wikipedia.org/wiki/Folding_seat#/media/File:1995_stock_folding_seats.JPG on Jun. 14, 2023, pp. 1.

International Search Report and Written Opinion dated May 11, 2023 for PCT Application PCT/E P2021/085530, pp. 1-12.

Cabin Crew Safety; Images from "The Flight Attendant Jump Seat"; retrieved from https://cabincrewsafety.aero/info/news/2014/66/the-flight-attendant-jump-seat.html on Jun. 14, 2023, pp. 2.

Disabled World; Images from "Airline Seat Design Allows Disabled Passengers to Fly in Own Wheelchair"; retrieved from https://www.disabled-world.com/disability/investors/airline-seats.php retrieved on Jun. 14, 2023, pp. 2.

Combined Search and Examination Report under Sections 17 and 18(3) dated Dec. 19, 2022 for GB Application 2019968.3, pp. 1-9.

* cited by examiner

VEHICLE SEAT FOR ACCOMMODATING A WHEELCHAIR

CROSS-REFERENCE TO RELATED APPLICATION(S)

This application is a U.S. National Stage of PCT Application No. PCT/EP2021/085530 filed Dec. 13, 2021, which claims priority to GB Application No. 2019968.3 filed Dec. 17, 2020, which are incorporated herein by reference, in their entirety, for any purpose.

The present disclosure relates to vehicle seats that are configured to accommodate wheelchairs without removal of the vehicle seat.

BACKGROUND

At present, when a wheelchair user wishes to take public or even private transport they may be required to transfer out of their wheelchair into a seat within the vehicle. This is particularly the case for aircraft which rarely have space in the cabin for a wheelchair user in their wheelchair, or even, an empty but non-folded wheelchair. While this may be suitable for short journeys or journeys which have rest stops, this can be difficult for long journeys where the wheelchair user may be unable to access restrooms or other facilities available to other passengers which they would be able to access if they remained in their wheelchair. This also means the wheelchair user must wait to be reunited with their wheelchair at the end of the journey, something that inconveniences them compared to other passengers.

Even in trains and buses where areas are often available that can be occupied by a wheelchair user remaining in their wheelchair, these areas are often segregated from the rest of the vehicle and may require the wheelchair user to travel facing a different direction to the majority of the seats. Furthermore, these areas can take up a relatively large amount of space in the vehicle meaning owners of public transport may try and limit the number of spaces available thus limiting how many wheelchair users can be accommodated.

It is an aim of the present examples to address the problems mentioned above. However, the examples described herein are not limited to examples which solve problems mentioned in this background section.

SUMMARY

Examples of preferred aspects and embodiments of the invention are as set out in the accompanying independent and dependent claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A first aspect of the disclosed technology relates to a vehicle seat configured to be fixed in a vehicle. The seat comprises a seat back configured such that when the seat is fixed in the vehicle there is a gap between a lower edge of the seat back and a floor of the vehicle to enable wheels of a wheelchair to protrude through the gap. The seat further comprises a seat base wherein the seat base is either: foldable between a first position in which the seat base acts as a base to the seat and a second position in which the seat base is stowed against the seat back; or removable from the seat back. The seat base is foldable or removable to allow the seat base to be stowed when the seat is used by the wheelchair. By having the seat base foldable or removable with respect to the seat back, the seat base can be stowed when the vehicle seat is used by a wheelchair. This enables the wheelchair to sit against the seat back and thus reduces the room required to accommodate the wheelchair. The gap between the lower edge of the seat back and the floor or, where applicable a plinth, enables the wheels of the wheelchair to pass through or protrude through the gap. This enables the back of the wheelchair to sit closer to the seat back than would otherwise be possible. This enables the wheelchair to be accommodated in a space that is smaller than otherwise possible. This also enables the wheelchair to be positioned in the seat such that a wheelchair user sitting in the wheelchair is seated in a position similar to that of a direct occupant of the vehicle seat or surrounding vehicle seats.

In one example, the seat base is foldable with respect to the seat back; and when the seat base is in the second position, a lowest edge of the seat base sits above the lower edge of the seat back. This prevents the seat base from protruding into the gap when the seat base is in the stowed position. This therefore prevents the seat base from blocking the wheels of the wheelchair from protruding through the gap. It is appreciated that in some examples, the lowest edge of the seat base may align with the lower edge of the seat back and the same effect may be achieved. Similarly, the lowest edge of the seat base may sit slightly below the lower edge of the seat back but not enough to prevent the wheels of the wheelchair from protruding through the gap.

In another example, the vehicle seat further comprises a first front leg which supports a first side of the seat base, wherein the first front leg is either foldable or removable to enable the first front leg to be stowed when the seat is used by the wheelchair. The presence of a front leg provides support to the seat base and thus helps provide a sturdy vehicle seat. Having the front leg foldable or removable means that the wheelchair can easily access the vehicle seat from the side and thus aids the wheelchair in accessing the vehicle seat area.

In one example, the vehicle seat further comprise a first back leg which further supports the first side of the seat base and there is no side support between the first front leg and the first back leg to enable unimpeded side access to the seat. This keeps the side of the vehicle seat free and provides easy access to the vehicle seat for any wheelchair.

In another example, the vehicle seat further comprises a baggage bar which is either foldable or removable with the seat base to enable the baggage bar to be stowed when the seat is used by the wheelchair. A baggage bar can prevent any baggage or luggage moving into the leg room of the vehicle seat in the event of a sudden acceleration or deceleration of the vehicle. Having the baggage bar foldable or removable ensures the baggage bar does not impede access of the wheelchair to the vehicle seat area.

In one example, the vehicle seat further comprises a cut away region on an underside of the seat base wherein the cut away region is sized and shaped to accommodate the first front leg and/or the baggage bar. The use of the cut away region, void or other gap on the underside of the seat base allows the first front leg and/or the baggage bar to be stowed against the seat base wherein the first front leg or baggage bar does not extend beyond the seat base. This prevents the wheelchair user or a passenger knocking or injuring themselves on the first front leg and/or baggage bar.

In another example, the vehicle seat further comprises a wheel protector foldable between a first position in which the wheel protector is stowed against an underside of the seat base and a second position in which the wheel protector extends through the gap between the lower edge of the seat back and the surface of the vehicle to provide protection for the wheels of the wheelchair. The wheel protector can prevent a passenger seated in a seat behind the vehicle seat accidentally kicking or knocking the wheels of the wheelchair. This prevents the passenger injuring themselves and disturbing and/or injuring the wheelchair user. Having the wheel protector in a stowed position when the vehicle seat is not accommodating a wheelchair provides more leg room to a passenger in the seat behind the vehicle seat when the vehicle seat is not being used to accommodate a wheelchair.

In one example the seat back comprises a removable cushion wherein removing the removable cushion from the seat back leaves a void in seat back which is sized and shaped to accommodate stowed seat base. In some examples, the removable cushion is foldable to allow easy storage. The use of a removable cushion or other form of lumbar support in the seat back enables the seat back to be thinned out when the vehicle seat is being used to accommodate a wheelchair. This means the seat base sits closer to the seat back than would otherwise be possible. This allows the wheelchair to sit further in the space of the vehicle seat than would otherwise be possible and thus reduces the space taken by the wheelchair. Having the removable cushion or other form of lumbar support in place when the vehicle seat is directly accommodating a passenger increases the comfort of the vehicle seat.

In one example the vehicle seat further comprises a floor guide configured to be fixed to the surface of the vehicle. The floor guide comprises: a first locking structure configured to securely hold a corresponding second locking structure on the wheelchair in place; and a guiding structure configured to guide the second locking structure so that the second locking structure locks with the first locking structure. The use of a floor guide with a locking structure enables the wheelchair to be locked or otherwise temporarily and removably engaged or attached to the floor of a vehicle or a plinth mounted to the floor of a vehicle. This secures the wheelchair in place and provides additional safety to a wheelchair user in the event of any sudden movement or tilting of the vehicle.

In one example, the vehicle seat further comprises a cut away region on an underside of the seat base wherein the cut away region is sized and shaped to accommodate part of a handle of the wheelchair. The handle of a wheelchair may protrude from the back of the wheelchair. Thus, the handle may limit how close a wheelchair can sit to a vehicle seat. By having a cut way, void or other form of gap on the underside of the base of the vehicle seat, the wheelchair can be positioned closer to the stowed vehicle seat enabling a more efficient use of space.

In another example, the vehicle seat further comprises a cut away region on the seat back wherein the cut away region is sized and shaped to enable a first wheel of a large wheeled or self-propelled wheelchair to protrude through. In some examples the cut away region is a first cut away region; and the seat back has a second cut away region spaced apart from the first cut away region and sized and shaped to enable a second wheel of a large wheeled or self-propelled wheelchair to protrude through. In other examples, the vehicle seat is one of a pair of vehicle seats, each comprising the features of the vehicle seat and wherein in use, a wheelchair is positioned between the pair of seats such that one wheel of the wheelchair passes through the cut away region in each seat back. The use of cut aways or other voids allows the wheels of a large wheeled or self-propelled wheelchair to be accommodated without overly raising the height of the vehicle seat. If the vehicle seat is wide enough there may be two cut aways or voids on a single vehicle seat spaced apart to enable the wheels of one side of the wheelchair to pass through each void/cut away. However, when the vehicle seat is narrower, two adjacent seats may both be adapted for accommodating a single wheelchair with one cut away in each vehicle seat.

In one example, the vehicle further comprises a back piece slidably attached to the seat back wherein the back piece is slidable between a first position in which the back piece covers the cut away region(s) and a second position in which the back piece is positioned above the cut away region(s). The back piece/slidable back piece can be used to cover the cut away region or cut away regions when the vehicle seat is not being used to accommodate a wheelchair or even when the vehicle seat is being used to accommodate a small wheeled, electric or attendant propelled wheelchair. This ensures the comfort of a passenger being directly accommodated in the vehicle seat. The use of a slidable back piece makes it easy to adapt the vehicle seat for use by a large wheeled or occupant propelled wheelchair.

In another example the seat base is foldable with respect to the seat back; and when the seat base is in the second position, a lowest edge of the seat base sits above the cut away region(s). This prevents the folded seat base from covering the cut away region(s) or void(s) and thus blocking access for the wheels of the wheelchair.

It will also be apparent to anyone of ordinary skill in the art, that some of the preferred features indicated above as preferable in the context of one of the aspects of the disclosed technology indicated may replace one or more preferred features of other ones of the preferred aspects of the disclosed technology. Such apparent combinations are not explicitly listed above under each such possible additional aspect for the sake of conciseness.

Other examples will become apparent from the following detailed description, which, when taken in conjunction with the drawings, illustrate by way of example the principles of the disclosed technology.

Figures 1A, 1B:
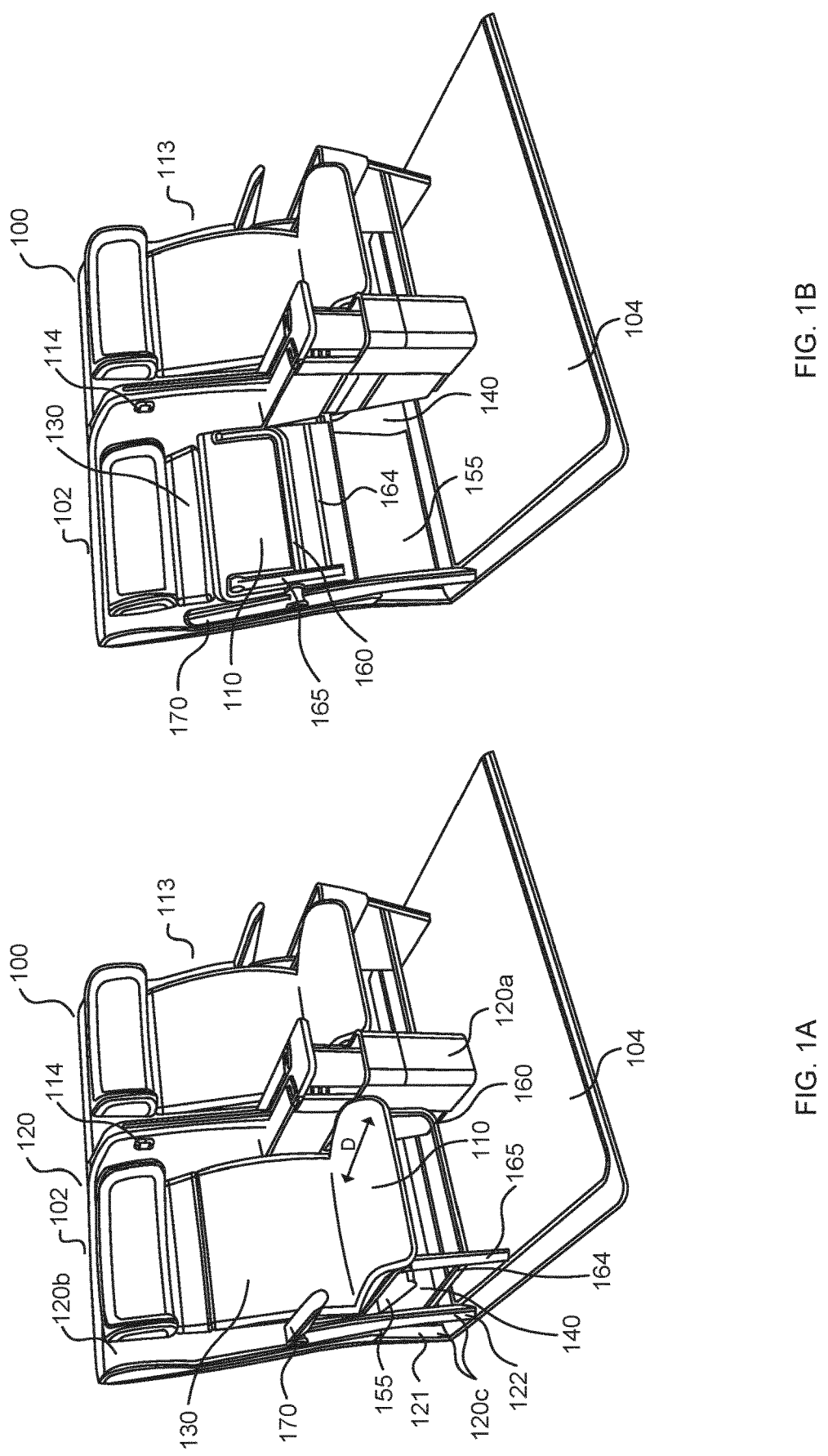
FIGS. 1A and 1B illustrate a front view of a pair of vehicle seats that include a vehicle seat that is adapted to accommodate a wheelchair.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is made for the purpose of illustrating the general principles of the present technology and is not meant to limit the inventive concepts claimed herein. As will be apparent to anyone of ordinary skill in the art, one or more or all of the particular features described herein in the context of one embodiment are also present in some other embodiment(s) and/or can be used in combination with other described features in various possible combinations and permutations in some other embodiment(s).

A vehicle seat suitable for accommodating a wheelchair is described. While it is understood that in many examples a user of the wheelchair may travel in the wheelchair accommodated by the vehicle seat, in other examples the vehicle seat may accommodate an unoccupied wheelchair, either because the wheelchair user is travelling in an alternative seat or for other reasons. The vehicle seat can be configured to be fixed or mounted in any suitable vehicle. For example, the vehicle seat can be configured to be fixed or mounted in an aircraft, a train, a bus or any other suitable form of public or private vehicle. Configuring the vehicle seat to be mounted in a vehicle can include ensuring the seat passes any necessary safety requirements, such as a 16G crash test with respect to an aircraft seat and/or furnishing the vehicle seat with any necessary support structure or apparatus with which to mount the vehicle seat into the vehicle.

FIG. 1A and FIG. 1B show a pair of adjacent vehicle seats 100 mounted into a vehicle such as an aircraft. However, the vehicle seats 100 could be mounted in any other suitable vehicle. The pair of seats 100 comprise the vehicle seat 102 which is configured to accommodate a wheelchair and a second seat 113 which may be a vehicle seat that is not adapted to accommodate a wheelchair. The second seat 113 is shown for illustration purposes and the skilled person would understand that in some examples the vehicle seat 102 which accommodates the wheelchair may be placed alone with no adjacent seats.

The vehicle seat 102 comprises a seat base 110 and a seat back 130. The skilled person would understand that the seat base 110 and seat back 130 can comprise any cushions or other forms of lumber support used to pad and/or line the vehicle seat 102 structure and are not limited to the skeleton of such structures.

The vehicle seat 102 in FIGS. 1A and 1B are shown mounted to a plinth 104. Where present, the second seat 113 and any further seats in a row with the vehicle seat 102 can also be mounted to the plinth 104. The use of plinth 104 enables the vehicle seat 102 to be mounted to an aircraft in a configuration that enables a separation between seats to be different from that provided by conventional floor tracks. The use of plinth 104 also provides a smooth ramp up to vehicle seat 102 making it easier to direct a wheelchair to the vehicle seat 102. While FIGS. 1A and 1B show a plinth 104 the skilled person would understand that the plinth 104 may not be necessary dependent upon the mounting system used to mount the vehicle seat 102 in the vehicle and/or aircraft.

The vehicle seat 102 can be mounted to the plinth 104, floor track or floor of the vehicle via support structure 120. The support structure 120 can form part of the vehicle seat 102 or be provided separately from the vehicle seat 102 as part of the vehicle or some other structure. In FIGS. 1A and 1B support structure 120 comprises a far side support 120a and a near side support 120c. The far side support 120a is located to the side of the vehicle seat 102 furthest from an aisle or other passageway used to access the vehicle seat 102. The far side support 120a is designed to be mounted to the plinth 104, floor track or floor of the vehicle to hold the vehicle seat 102 in place. The far side support 120a may extend along the entire depth D of the vehicle seat 102. The near side support 120c is located to the side of the vehicle seat 102 used to access the vehicle seat 102. The near side support 120c is also designed to be mounted to the plinth 104, floor track or floor of the vehicle. The near side support 120c comprises a leg 121 that sits behind vehicle seat 102. The near side support 120c may also comprise a second leg 122 positioned in proximity to the first leg 121. The near side support 120c does not extend along the entire depth D of the vehicle seat 102. This is to enable easy access to the seat area from the side in order to enable a wheelchair to be easily positioned within the seat area. In some examples support structure 120 further comprises back support 120b which provides additional support to seat back 130.

The seat base 110 and seat back 130 can be pivotably mounted to the support structure 120. This enables the seat base 110 to be stowed as described later. This also enables the seat back 130 to be tilted with respect to the support structure 120 to place the vehicle seat 102 in a recline position either to aid accommodation of a wheelchair or for the comfort of a passenger using the vehicle seat 102 when the vehicle seat 102 is accommodating a passenger directly. In the example shown in FIGS. 1A and 1B the seat base 110 and seat back 130 are pivotably attached to the near side support 120c and far side support 120a. This provides a secure connection when affixing the vehicle seat 102 into the vehicle. However, in other examples, the vehicle seat 102 may be mounted into the vehicle in another fashion. For example, if the seat back 130 does not need to recline, the seat back 130 may be attached to back support 120b. In other examples, only the seat back 130 may be connected to the near side support 120c and far side support 120a either pivotably or fixable. The seat base 110 may then be pivotably mounted to the seat back 130. In yet another example, only the seat base 110 may be attached to the support structure 120, for example via back support 120b and/or near side support 120c and far side support 120a. The seat back 130 may then be pivotably mounted to the seat base 110 and supported via the seat base 110.

Figure 2:
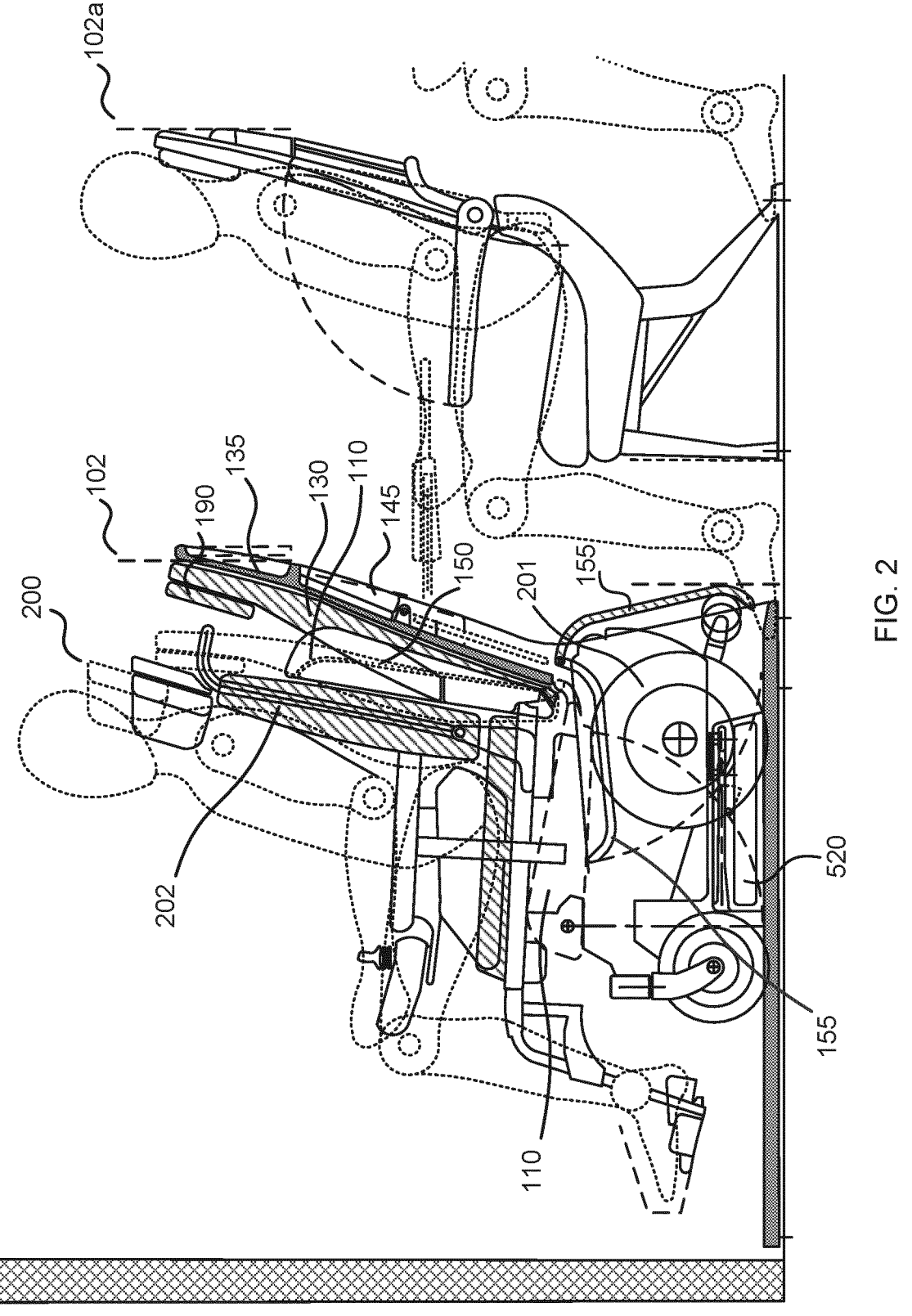
FIG. 2 illustrates a side view of a vehicle seat adapted to accommodate a wheelchair with a wheelchair positioned within the vehicle seat area.

The seat back 130 is separated from the floor of the vehicle or the plinth 104 by a gap 140. When there is a back support 120b, then the back support 120b is also separated from the floor of the vehicle or the plinth 104 by the gap 140. In particular, the gap 140 is between a lower edge of the seat back 130 and the floor of the vehicle. As shown in FIG. 2 the gap 140 is large enough to enable the back wheels 201 of a wheelchair 200 to pass through or at least protrude into the space behind the vehicle seat. Wheelchair 200 in FIG. 2 is an electric wheelchair. However, the gap 140 is sized to fit a standard small-wheeled or attended propelled 30 wheelchairs. The back wheels 201 of the wheelchair 200 may extend behind vehicle seat 102 into the foot space and/or leg room of another vehicle seat 102a behind the vehicle seat 102. This other vehicle seat 102a may be a standard vehicle seat or may be adapted in the same manner as discussed above. If vehicle seat, 102, is mounted against a wall then gap 140 extends into the wall and the back wheels 201 of the wheelchair 200 extend through the gap 140 through to the 35 other side of the wall.

The seat base 110 is pivotable with respect to the seat back 130. This enables the seat base 110 to be folded with respect to the seat back 130. In particular, the seat base 110 can be folded between a first position shown in FIG. 1A and a second position shown in FIG. 1B. In the first position the seat base 110 acts as a base to the vehicle seat 102 and enables a passenger to sit in the vehicle seat 102. In the second position the seat base 110 is stowed, put away, deposited or otherwise stored or positioned against the seat back 130. In the second position the seat base 110 runs parallel to the seat back 130 and sits adjacent the seat back 130. If the seat back 130 tilts, the seat base 110 may tilt with the seat back 130 to remain parallel to the seat back 130.

When the seat base 110 is folded against seat back 130, then a lowest edge of the seat base 110 sits above the lower edge of the seat back 130. This means that folding the seat base 110 against the seat back 130 does not reduce the size of gap 140. In other examples, the seat base 110 may extend into the gap 140 but only slightly thus ensuring the gap 140 remains suitably sized to enable the back wheels 201 of a wheelchair 200 to pass through or protrude. In one example, the base 110 is pivoted with respect to the seat back 130 at or close to a back of the seat base 110 for example at a point close to the seat back 130. This means that when the seat base 110 is pivoted the majority of the seat base 110 extends upwards. This also removes the need for extended side supports which may be necessary if the seat base 110 were to be pivoted at a point towards the centre or front of the seat base 110.

FIG. 2 shows the vehicle seat 102 in use by a wheelchair 200. As discussed above, the seat base 110 has been folded against seat back 130 and the wheels 201 of the wheelchair 200 extend through gap 140. As can be seen in FIG. 2, when vehicle seat 102 is used by wheelchair 200, a back 202 of the wheelchair 200 abuts the seat back 130/stowed seat base 110 of the vehicle seat 102. Thus, the wheelchair 200 sits tight against seat back 130/seat base 110 of vehicle seat 102 and uses the area of vehicle seat 102 in a similar fashion to a passenger seated directly in vehicle seat 102.

Figures 4A, 4B:
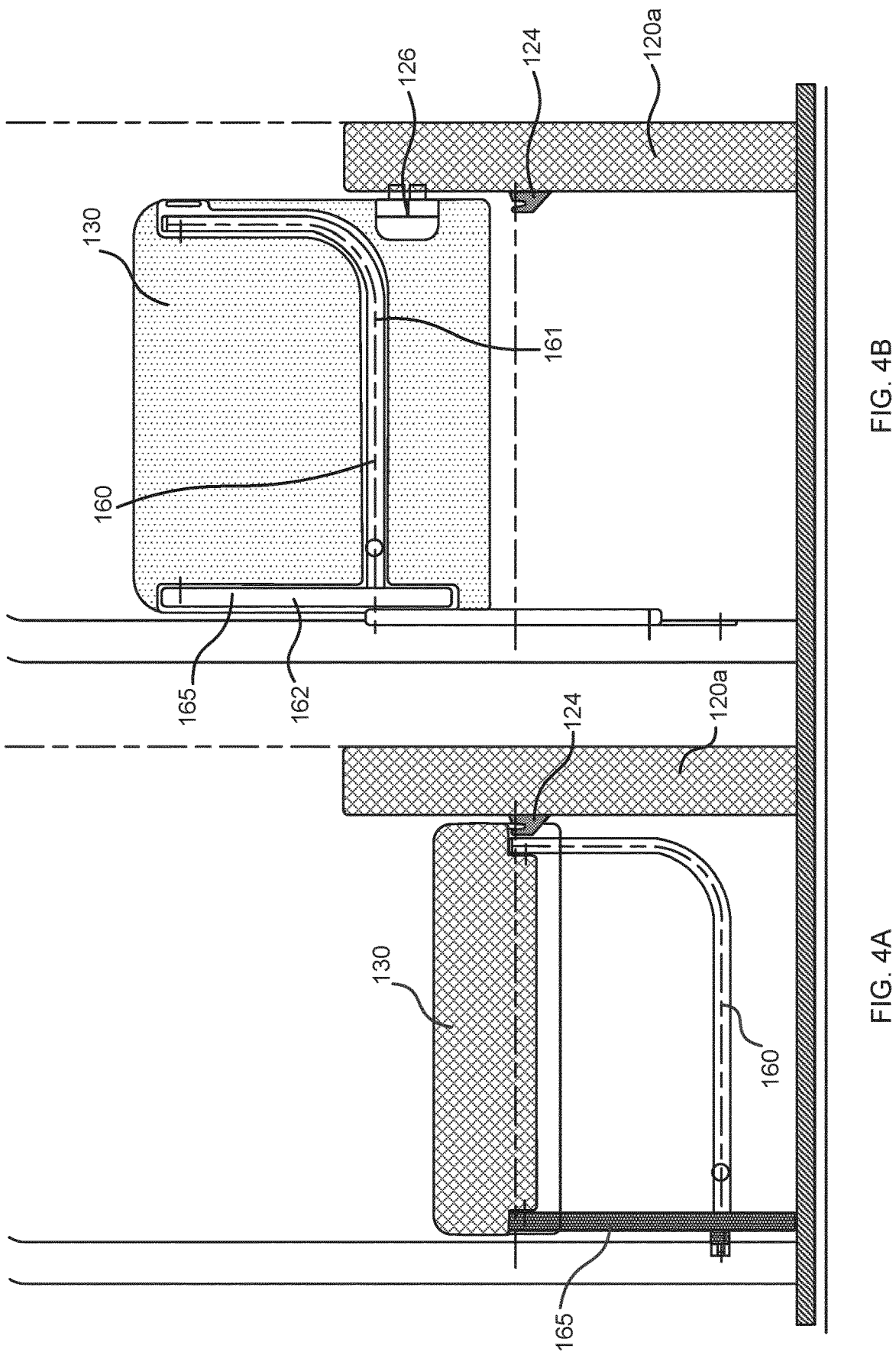
FIGS. 4A and 4B are front views of a lower part of a vehicle seat adapted to accommodate a wheelchair illustrating the seat base and the floor in front of the vehicle seat.

As discussed above, the seat base 110 should not prevent the back wheels 201 of a wheelchair 200 passing or protruding through the gap 140 when the seat base 110 is folded or stowed against the seat back 130. FIG. 4 shows how seat base 110 moves when moving between the seated position and the stowed position. FIG. 4A shows the seat base 110 in a down, seated, position where the seat base 110 can be used as a base to vehicle seat 102. In contrast FIG. 4B shows the seat base 110 in a stowed position. In the example shown in FIGS. 4A and 4B, when the seat base 110 is in the stowed position a lowest edge of the seat base 110 sits higher than a lowest edge of the seat base 110 in the down or seated position. This further ensures that the seat base 110 does not unnecessarily intrude into the gap 140 and prevent the back wheels 201 of the wheelchair 201 passing through or protruding into the gap 140.

As shown in FIG. 4A, when the seat base 110 is in the first, down, position a latch or support 124 may be connected to side support 120a and be configured to support front of seat base 110 at a side of seat base 110 nearest side support 120a. This latch or support 124 provides support for seat base 110 to ensure seat base is secured in position when seat base 110 is in the first position.

As shown in FIG. 4B, a latch or support 126 may be provided to support or secure the seat base 110 when the seat base 110 is the second, stowed, position. Latch or support 126 may be attached to far side support 120a. Latch or support 126 may be moveable between a first or undeployed position in which it does not engage with seat base 110 and a second or deployed position in which it secures seat base 110 in position. In the first position latch or support 126 may sit against far side support 120a and not extend beyond far side support 120a to avoid engaging with seat base 110. In the second position, shown in FIG. 4B, latch or support 126 extends beyond far side support 120a and engages with seat base 110 holding seat base 110 against seat back 130. The latch or support 126 may be slidable or rotatable between the two positions. Latch or support 126 is separate from latch or support 124. When both are present, latch or support 124 may be considered a first latch or support 124 and latch or support 126 may be considered a second latch or support 126.

In the example of FIGS. 4A and 4B a baggage side bar is linked from the back leg to the front leg so that as the seat is raised up to receive the wheelchair the front leg also moves up and out of the way.

Figure 3:
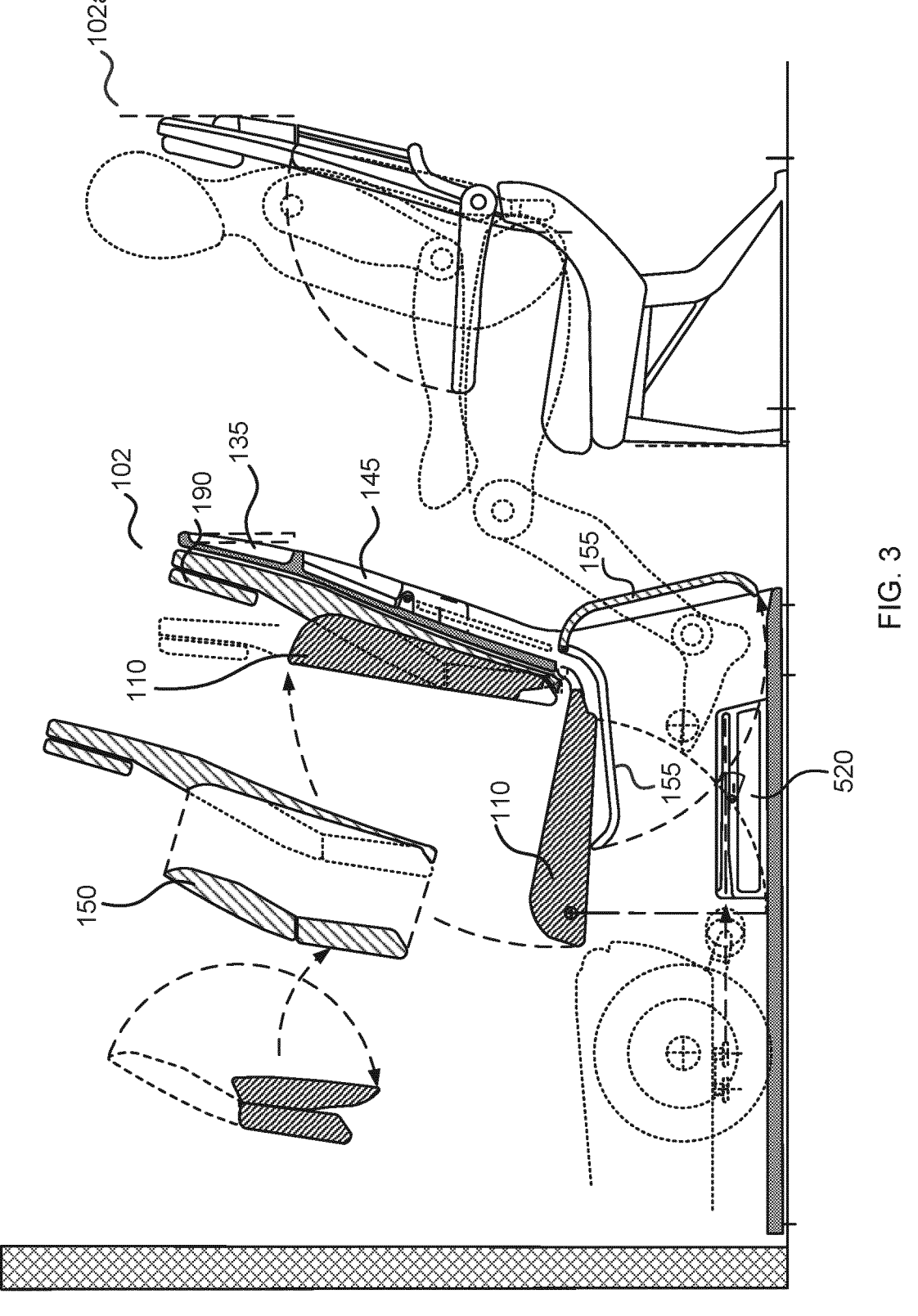
FIG. 3 illustrates a side view of a vehicle seat adapted to accommodate a wheelchair and provides a detail view of a removeable cushion that can be used with vehicle seat.

Returning to FIG. 2, it is desirable that seat back 130 does not obstruct the back 202 of wheelchair 200. To this end seat back 130 may be tilted backwards when the vehicle seat 102 is configured for accommodating a wheelchair 200. In addition, seat back 130 and seat base 110 may have thin cushions so that when seat base 110 is folded against seat back 130 the combined depth of seat base 110 and seat back 130 is not considerably greater than the depth of seat back 130. However, in some examples, thin cushions are not feasible and other techniques for slimming the vehicle seat 102 are required. FIG. 3 shows one example of how this may be achieved. FIG. 3 shows a vehicle seat 102 where seat back 130 of vehicle seat 102 includes a removable cushion 150. When removeable cushion 150 is removed from seat back 130 a void is left in the cushioning/lumbar support of seat back 130 wherein the void is sized and shaped to fit folded up seat base 110. In one example seat base 110 may fit entirely into the void. However, in another example, shown in FIG. 3 seat base 110 may extend beyond the void but not to a degree where it obstructs the back 202 of wheelchair 200 at least when vehicle seat 102 is tilted to its "reclined" position. Removable cushion 150 may be folded around a pivot point to enable easy storage. In other examples, cushion 150 may not be removable and may instead fold upwards to form a void to encompass seat base 110. In another example a slidable cushion may be used as described with respect to FIGS. 6 and 7.

As shown with respect to FIGS. 1A, 1B, 2 and 3, vehicle seat 102 may further comprise a wheel protector 155. FIG. 1a shows the wheel protector 155 in a first position in which it is stowed against an underside of seat base 110. In this position wheel protector 155 is stored out of the way to not disrupt a passenger in the vehicle seat 102 or a passenger in any other vehicle seat 102a behind vehicle seat 102. In some examples, when wheel protector 155 is in the first position it sits close to the underside of seat base 110 to allow luggage to be stored under vehicle seat 102. FIG. 1B shows the wheel protector 155 in a second position. In this position the wheel protector 155 extends through gap 140 and may extend into a space behind vehicle seat 102. As shown in FIG. 2 in the second position the wheel protector 155 provides protection to the back wheels 201 of wheelchair 200 to prevent a passenger in another seat 102a behind the vehicle seat 102 accidentally kicking or jolting the back wheels 201 of the wheelchair 200. The wheel protector 155 may be foldable between the first position and the second position. The wheel protector 155 can be pivotably attached to either support structure 120 or seat back 130 to allow it to be folded between the first position and the second position.

Vehicle seat 102 may comprise a baggage bar 160. Baggage bar 160 may run parallel to the floor of the vehicle or plinth 104 and be raised above the floor of the vehicle or plinth. Baggage bar 160 prevents any baggage or luggage stored under the vehicle seat 102 from moving into the leg room of the vehicle seat 102 in any sudden deceleration or acceleration event or tilting of the vehicle. This keeps the leg room of the vehicle seat 102 free in any sudden deceleration or acceleration event and thus aids evacuation from the vehicle. In relation to aircraft, a baggage bar 160 may be a safety requirement. However, in other examples, the baggage bar 160 may be a preference. Vehicle seat 102 may have a baggage bar 160 that is foldable with respect to seat base 110. For example, baggage bar 160 can be pivotably attached to seat base 110 so that baggage bar 160 can be stowed against seat base 110. FIG. 1A shows baggage bar 160 in a first non-stowed position. In this Figure baggage bar 160 serves as a standard baggage bar preventing the movement of any luggage stowed under vehicle seat 102. FIG. 1B shows baggage bar 160 in a second stowed position. In this position the baggage bar 160 sits against an underside of the seat base 110. This ensures the baggage bar 160 does not imped access to the vehicle seat 102.

FIG. 1B shows how the baggage bar 160 may be positioned in a cut away, void or indent within the underside of the seat base 110. This cut away/void/indent is shown in more detail in FIG. 4B although again with baggage bar 160 stowed within the cut away 161. The cut away 161 is sized and shaped to accommodate the baggage bar 160. This means when the baggage bar 160 is stored or positioned against the underside of the seat base 110 it does not extend beyond the seat base 110. This aids storage of the baggage bar 160 and further reduces the depth of the vehicle seat 102 when it is adapted for accommodating a wheelchair 200. This also prevents the solid baggage bar 160 being a hazard that a person within the vicinity of the vehicle seat 102 may accidentally knock or otherwise injure themselves on.

Vehicle seat 102 may further comprise a front leg 165. The front leg 165 can be pivotably attached to the seat base 110 and be pivotable or foldable between two positions. In a first position shown in FIGS. 1A and 4A the front leg 165 can provide support to the front of seat base 110 when the seat base 110 is down and acting as a base to vehicle seat 102. In this position front leg 165 may contact the floor of the vehicle or the plinth 104. In some examples the front leg 165 may connect firmly to the floor of the vehicle or the plinth 104 to increase the support being offered to the seat base 110. The front leg 165 may provide support to the opposite side of seat base 110 to side support 120a, and where applicable latch or support 124. In the second portion shown in FIGS. 1B and 4B, the front leg 165 is stowed/stored or otherwise positioned against stowed seat base 110. This allows the front leg 165 to be stored out of the way when the vehicle seat 102 is being used by a wheelchair 200. As with baggage bar 160, the front leg 165 may be stored/stowed or positioned within a void/gap or cut away 162 in the underside of the seat base 110. This aids with storage of the front leg 165 and prevents any person within the vicinity of the vehicle seat 102 accidentally bumping into the stowed front leg 165.

A further void or gap in the underside of the seat base 110 may be present to accommodate the handle of a wheelchair. This is discussed in more detail below with respect to FIG. 7 where this feature is shown.

In some examples, baggage bar 160 may be present but there be no baggage side bar. However, as shown in FIGS. 1A and 1B a side baggage bar 164 may also be present. Side baggage bar 164 may run parallel to the floor or plinth 104 and be raised above the floor or plinth 104. Side baggage bar 164 prevents any baggage or luggage stored under the vehicle seat 102 from moving into the side/centre aisle or passageway in the any sudden deceleration or acceleration event or tiling of the vehicle. This keeps the aisle or passageway of the vehicle free and aids evacuation from the vehicle. In relation to aircraft, a side baggage bar 164 may be a safety requirement. However, in other examples, the side baggage bar 164 may be a preference. Side baggage bar 164 may be foldable with respect to vehicle seat 102. For example, side baggage bar 164 may be pivotably attached to front leg 165 and removeably attached to near side support 120c of the vehicle seat 102. The side baggage bar 164 may be foldable between a first or non-stowed position shown in FIG. 1A and a second or stowed position shown in FIG. 1B. In the first position, side baggage bar 164 functions as a side baggage bar preventing baggage entering an aisle. In the second position, shown in FIG. 1B side baggage bar 164 may be stowed against seat base 110 in that side baggage bar 164 may sit against seat base 110. In some examples, seat base 164 may comprise a cut away or void designed to accommodate side baggage bar 164 as discussed above with respect to baggage bar 160 and front leg 165.

Vehicle seat 102 may comprise an arm rest 170 pivotable attached to the seat back 130 or the support structure 120. The arm rest 170 can be pivoted between a first position shown in FIG. 1A where the arm rest 170 is down and can be used by an occupant of vehicle seat 102 to rest their arm and a second position shown in FIG. 1B where the arm rest 170 is stored. In the stored position, the arm rest 170 pivots upward to sit alongside seat back 130. The arm rest 170 can be moved into the stowed position when the vehicle seat 102 is being used to accommodate a wheelchair 200. This enables easy access to the vehicle seat 102 area. However, the arm rest 170 may also be used in the upright position when a passenger is sitting directly in vehicle 102 in accordance with safety guidelines and passenger preference.

As shown in FIGS. 2 and 3, in some examples, vehicle seat 102 may comprise a tray table 145 pivotably attached to seat back 130 and for use by a vehicle seat 102a behind vehicle seat 102. The tray table may be pivotable from a first stowed position where it is against seat back 130 to a second open position where it acts as a tray table for vehicle seat 102a. In the open position tray table 145 may be configured to extend towards the occupant of vehicle seat 102a, when pulled towards the occupant of vehicle seat 102a to enable easier use of the tray table 145.

As shown in FIGS. 2 and 3, in some examples vehicle seat 102 may comprise an entertainment screen 135 attached to a back of seat back 130 and for use be a vehicle seat 102a behind vehicle seat 102. The entertainment screen 135 may be pivotable between a first stowed position and a second viewing position. In the stowed position, the entertainment screen 135 may be stored against seat back 130. In the second viewing position, entertainment screen 135 may be tilted close to the occupant of a vehicle seat 102a behind vehicle seat 102 to enable easier viewing of the entertainment screen 135.

In some examples not shown in the Figures, the headrest 190 may be configured to tilt or pivot backwards with respect to seat back 130. In a first position, which may be an untitled position, the headrest 190 may serve as a headrest for a direct occupant of the vehicle seat 102. In a second position, which may be a tilted position, the headrest 190 can be in a stowed position or otherwise moved away from the seat back 130 to accommodate a handle of the wheelchair 200. This can enable to wheelchair 200 to sit closer to seat back 130 than would otherwise be possible.

The vehicle seat 102 may also comprise other features often provided with known vehicle seats. For example, the vehicle seat 102 may comprise an attended call button (not shown) or a reading light 114 that can be used to illuminate the vehicle seat 102 area.

The above examples focus on adapting a vehicle seat 102 to accommodate a wheelchair 200 where an electric, small wheeled or attendant propelled wheelchair is being used. While it would be possible to adapt the above examples to work for a large wheeled or occupant propelled wheelchair, in some situations this may result in the seat base 110 being too far from the floor of the vehicle or plinth 104 and so may be impractical in some scenarios. Below an adaptation is discussed that would allow accommodation of such large wheeled or occupant propelled wheelchairs without considerably raising the height of vehicle seat 102. This adaptation can be used with any of the features mentioned above.

FIGS. 5 to 9 show a vehicle seat 102 or a pair of vehicle seats 100 with further adaptations to accommodate a large wheeled or attendant propelled wheelchair. FIGS. 5 to 9 show a vehicle seat 102 or pair of vehicle seats 100 mounted in a vehicle such as a train. However, the seat 102/seats 100 could be mounted in any other suitable public or private vehicle.

Figure 5:
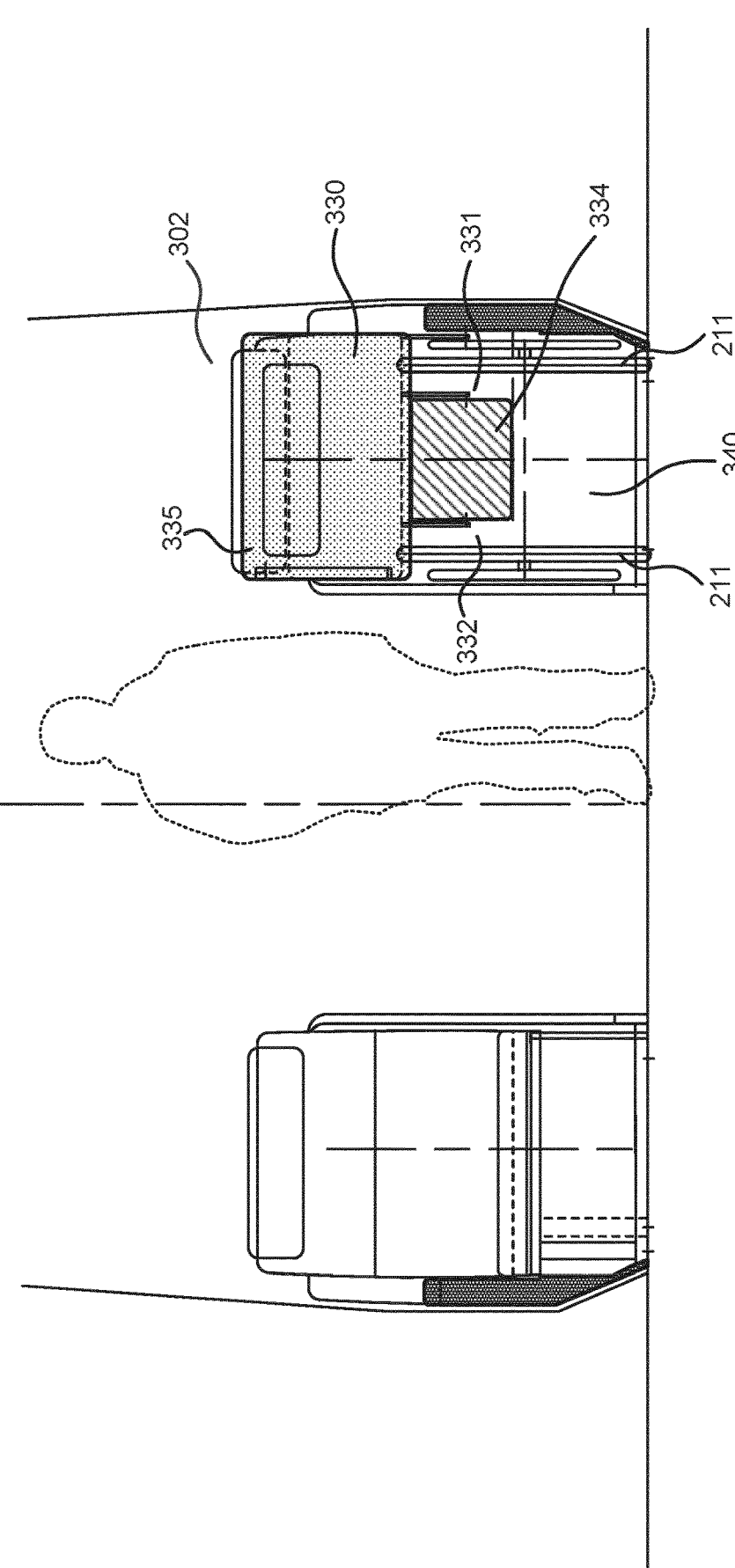
FIG. 5 is a back view of a vehicle seat adapted to accommodate a large wheeled wheelchair illustrated with a wheelchair positioned within the vehicle seat area.
Figure 6:
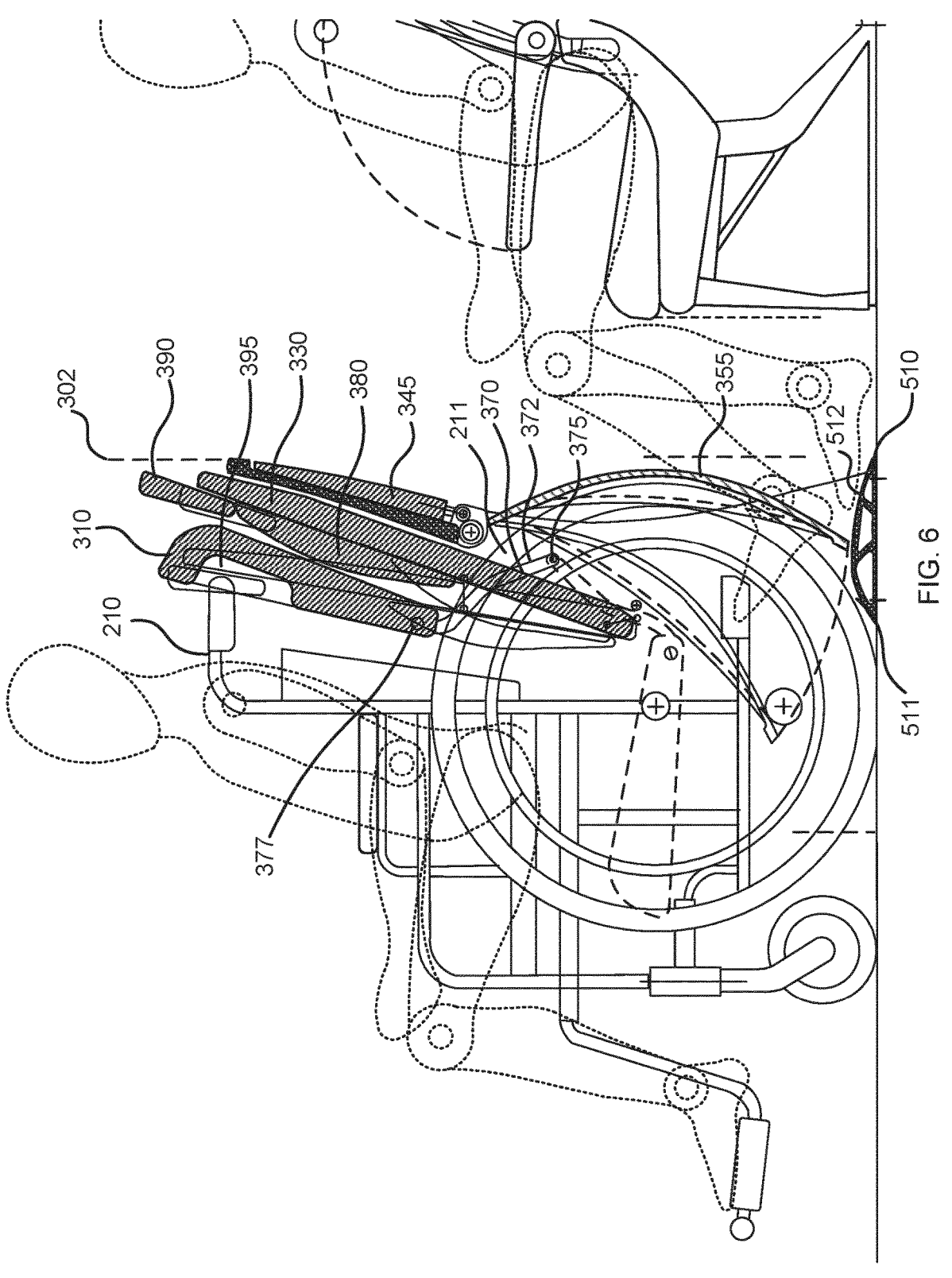
FIG. 6 is a side view of a vehicle seat adapted to accommodate a large wheeled wheelchair illustrated with a wheelchair positioned within the vehicle seat area.

FIG. 5 shows a single vehicle seat 302 configured to accommodate the back wheels 211 of a large wheeled wheelchair 210 shown in FIG. 6. Single vehicle seat 302 is shown on its own and not as a group of seats. However, dependent upon the width of the vehicle, vehicle seat 302 may be positioned adjacent other seats.

Although FIGS. 5 and 6 do not show a support structure for mounting the vehicle seat 302 in a vehicle, the vehicle seat 302 can be mounted in the vehicle in any suitable way including using the support structure described with respect to FIGS. 1 to 4.

Seat back 330 of vehicle seat 302 comprises two cut away regions 331 and 332. These cut away regions 331 and 332 are sized and shaped to accommodate the wheels 211 of a large wheeled wheelchair 210. These cut away regions 331 and 332 extend gap 340 between seat back 330 and the floor of the vehicle or the plinth on either side of the vehicle seat 302. In FIG. 5 the cut away regions/voids/gap comprise a first cut away region/void/gap 331 and a second cut away region/void/gap 332. The first cut away region 331 is spaced apart from the second cut away region 332. A first wheel of the wheelchair 210 passes or protrudes through the first cut away region 331 and a second wheel of the wheelchair 210 passes or protrudes through the second cut away region 332. The first cut away region 331 and second cut away region 332 may be separated from each other by a lower section 334 of seat back 330. The lower section 334 of seat back 330 provides support to the structure of vehicle seat 302 and may also provide lumbar support. The lower section 334 of seat back 302 may be connected to an upper section 335 of seat back 330. The upper section 335 of seat back 330 may be wider than the lower section 334 of seat back and provides lumbar support to an occupant of the vehicle seat 302.

In one example the cut away regions 331, 332 are achieved through the lower section 334 and the upper section 335 wherein the upper section 335 is positioned above the lower section 334. The lower section 334 is narrower than the upper section 335. A gap between the lowest edge of the upper section and the vehicle floor or a mounting plinth is large enough to enable wheels 211 of a large wheeled or occupant propelled wheelchair 210 to pass through or protrude into the space. When the wheelchair 210 is in position, the lower section 334 of the seat back 330 sits between the wheels 211 of the wheelchair 210 and so does not disrupt their passage. The lower section 334 provides support to the structure of the vehicle seat 302 and can provide lumbar support.

When cut away sections 331, 332 are used to enable the passage of wheels 211 of a large wheeled wheelchair 210 then seat base 310 needs to be stowed in a manner that does not disrupt the passage of the wheels 211 through the cut aways 331, 332. FIGS. 6 and 7 illustrate one way this can be achieved. In this example, seat base 310 is pivotably coupled to seat back via an extended pivot mechanism 370. The extended pivot mechanism comprises a pivot point 375 coupled to either the seat back 330 or a seat support structure (not shown). The pivot point 375 is coupled to a first end of an elongate pivot arm 372 which pivots around pivot point 375. A second end of the pivot arm 372 is coupled to the seat base 310. By moving the pivot arm 372 around the pivot point 375, the seat base 310 can be moved between a first position and a second position. In the first, down position, the seat base 310 acts as a base to the vehicle seat 302. In the second, stowed position, the seat base 310 is stored or stowed against the seat back 330 but above cut away regions 331 and 332 e.g. the seat base 310 can be stowed or stored against upper section 335 but not against lower section 334. For example, the lowest edge of seat base 310 may not extend below the lowest edge of upper section 335. In some examples, second end of pivot arm 372 may be connected to seat base 310 by second pivot point 377 to allow for more efficient or tidy storage of the seat base 310.

Figures 7A, 7B:
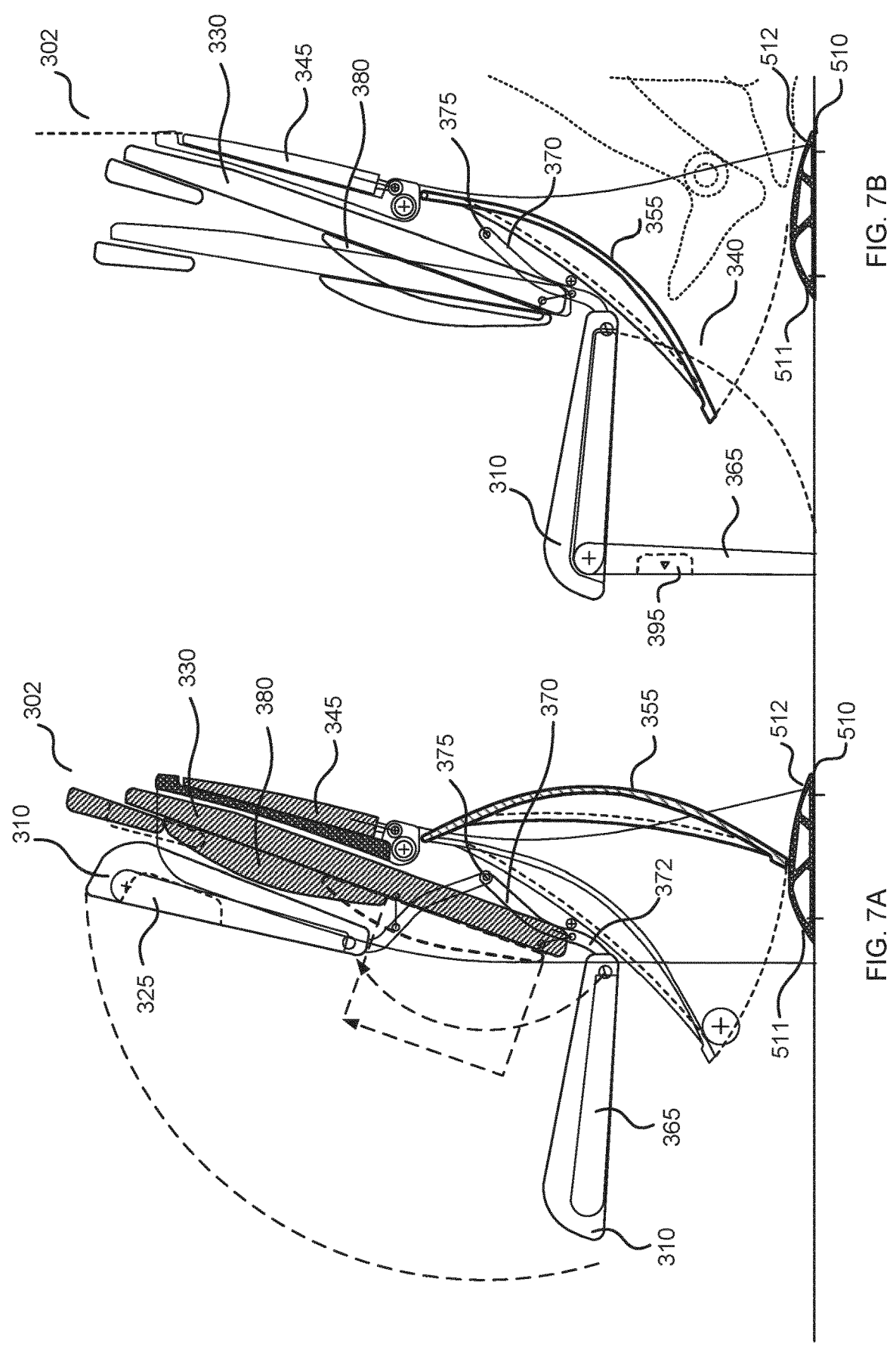
FIGS. 7A and 7B show side views of a vehicle seat adapted to accommodate a large wheeled wheelchair illustrated without a wheelchair positioned within the vehicle seat area.

In the above examples, seat back 330 comprises cut aways 331, 332 which reduce a width of a section of seat back 330. An occupant of vehicle seat 302 may find this uncomfortable or other requirements may mean that such cut aways 331, 332 cannot be present when vehicle seat 302 is directly occupied or is not being used to accommodate a wheelchair 210. FIGS. 6 and 7 show a slidable back piece 380 which can be used to cover these cut aways/gaps 331, 332. FIG. 7B shows the slidable back piece 380 in a first position or a down position where the back price 380 covers cut away regions 331, 332. When the vehicle seat 302 is being adapted to accommodate a wheelchair 210, the slidable back piece 380 is slid from the first position to a second position shown in FIGS. 6 and 7A. In this stowed position, the slidable back piece 380 sits above the cut away regions 331, 332 so that the wheels 211 of wheelchair 210 have unimpeded access to the cut away regions 331, 332. When seat back 330 comprises an upper section 335 and a lower section 334, in the second position the back piece 380 may sit above the lower section 334 so that the wheels 311 of wheelchair 210 can pass through cut aways 331, 332.

In some examples, vehicle seat 302 may further comprise a slidable head rest 390 as shown in FIG. 6. The slidable head rest 390 may further increase the comfort of vehicle seat 302 when it is being directly occupied by a passenger. Slidable head rest 390 is slidable between a first position and a second position. In the first position, shown as an outline in FIG. 6, head rest 390 acts as a head rest for a passenger occupying vehicle seat 302. In the second position, shown in FIG. 6, the head rest 390 is moved upwards. This enables slidable back piece 380 to be slid into a higher second position which prevents head rest 390 disrupting movement of back piece 380.

In FIGS. 7A and 7B a link is indicated between the pivot arm and the seat back. The link is schematic and is intended that there is a mechanism for securely locking the seat base in it's upright position. Any suitable locking mechanism is used.

Figure 8:
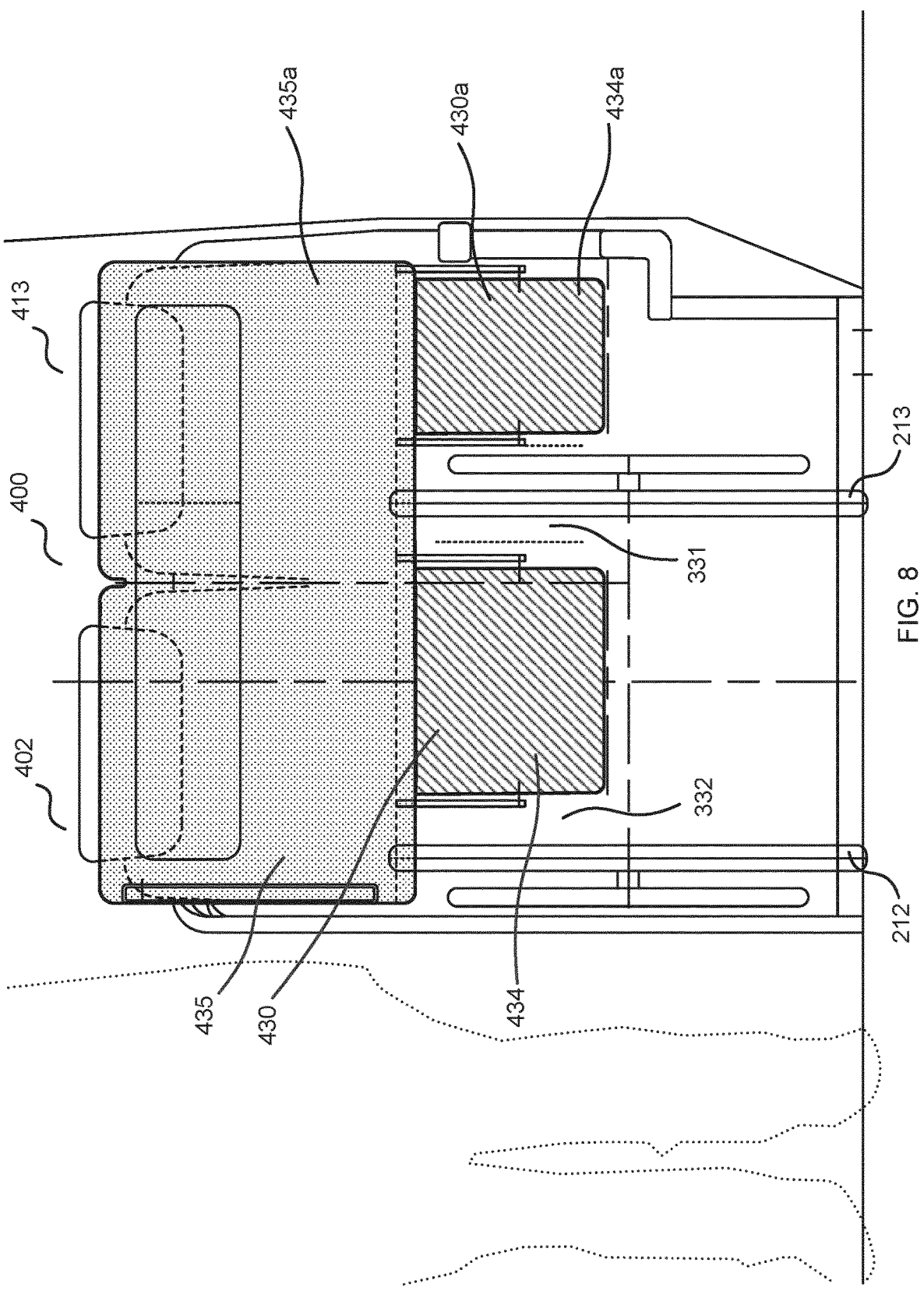
FIG. 8 shows a back view of a pair of vehicle seats both of which are adapted to accommodate a single large wheeled wheelchair.
Figure 9:
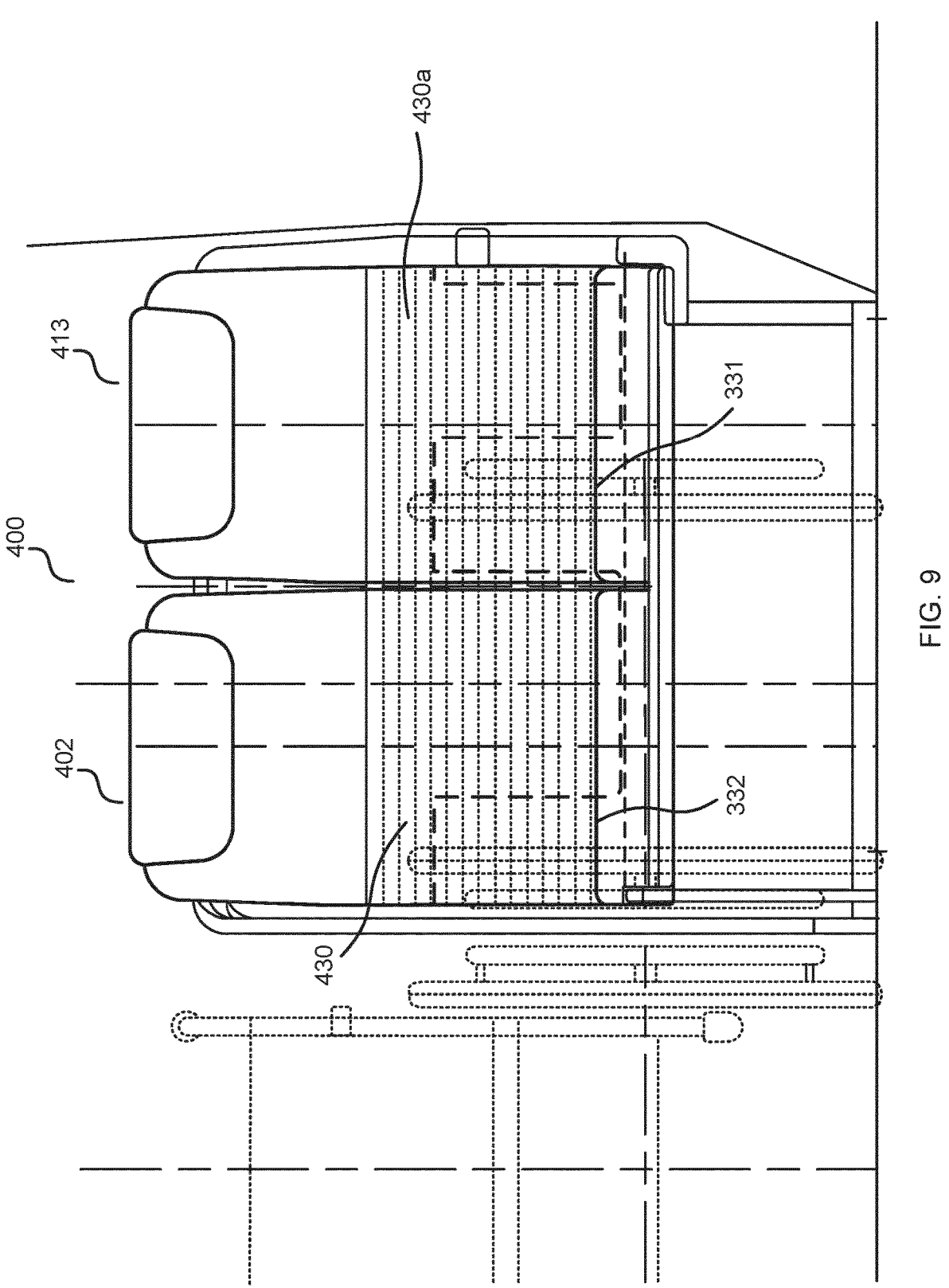
FIG. 9 shows a second back view of a pair of vehicle seats both of which are adapted to accommodate a single large wheeled wheelchair.

FIGS. 5 to 7 show one example of how a single vehicle seat 302 may be adapted to accommodate a self-propelled wheelchair 210 while surrounding seats can remain unadapted or can be adapted for accommodation of another wheelchair. However, in some examples, a single seat is too narrow to accommodate a wheelchair on its own. In these examples, it may be desirable to adapt a pair of seats 400 to accommodate a single wheelchair. This is shown on FIGS. 8 and 9. FIGS. 8 and 9 show pair of vehicle seats 400 comprising first vehicle seat 402 and second vehicle seat 413. The pair of vehicle seats 400 may be a lone pair of vehicle seats. However, they may also be present in a row with other vehicle seats.

In pair of vehicle seats 400 both first vehicle seat 402 and second vehicle seat 413 have been adapted for accommodation of a single wheelchair 210. In this example, seat back 430 of first vehicle seat 402 comprises first cut away region 332 while seat back 430a second vehicle seat 413 comprises second cut away region 331. The first cut away region 332 accommodates a first back wheel 312 of a large wheeled wheelchair 310 while second cut away region 331 accommodates a second back wheel 313 of a large wheeled wheelchair. In use the wheelchair is positioned between the pair of vehicle seats 400 with a first wheel passing through cut away 332 and a second wheel passing through cut away 331. Each vehicle seat 402, 413 of the pair of vehicle seats 400 may be configured according to vehicle seat 302 described above. For example, each vehicle seat 402, 413 may comprise an upper section 435, 435a and a lower section 434, 434a. Each vehicle seat 402, 413 may also comprise a slidable back piece to cover cut away 332 or 331 when the vehicle seat 402, 414 is used for directly accommodating a passenger. FIG. 8 shows the pair of vehicle seats 400 either without a slidable back piece or with the slidable back piece in a raised position. FIG. 9 shows the pair of vehicle seats 400 with a slidable back piece in a lower position in which it covers cut aways 331 and 332.

The vehicle seat 302, 402, 413 in FIGS. 5 to 9 may comprise further features as discussed with respect to FIGS. 1 to 4 above. For example, FIGS. 6 and 7 show wheel protector 355 used to protect the wheels 211 of wheelchair 210. As with wheel protector 355, wheel protector 355 is moveable between a first position in which it is stowed against an underside of seat base 310 as shown in FIG. 7B and a second position in which it extends through gap 340 to provide protection to the back wheels 211 of wheelchair 210. The wheel protector 355 may be foldable between the first and second positions. As shown in FIG. 7, the wheel protector 355 may be pivotably attached to a back of either support structure or seat back 330 at a vertical position near or above cut aways 331 and 332. This ensures that when the wheel protector 355 is in the second position, it does not disrupt passage of the wheels 311 through the cut aways 331, 332. As shown in FIG. 7B, this may mean that in the first stowed position, wheel protector 355 may sit substantially in gap 340. However, this still limits encroachment of wheel protector 355 into the leg room of any passenger behind vehicle seat 302.

The vehicle seat 302, 402, 413 in FIGS. 5 to 9 may also comprise front leg 365 shown in FIG. 7 and as described previously with respect to FIGS. 1 and 4. Front leg 365 is foldable between a first position and a second position. In the first position, shown in FIG. 7B, front leg 365 can provide support to the front of seat base 310 when the seat base 310 is acting as a base to vehicle seat 302, 402, 414. In this position front leg 365 may contact the floor of the vehicle or the plinth. In some examples the front leg 365 may connect firmly to the floor of the vehicle or the plinth to increase the support being offered to the seat base 310. In the second position, shown in FIG. 7A, the front leg 365 may be stowed or stored against seat base 310. As shown in FIG. 7A, the seat base 310 may comprise a void or gap in the underside of seat base 310 which front leg 365 may sit in when stowed.

FIG. 6 shows how an underside seat base 310 of vehicle seat 302 may comprise a void, gap or cut out 395. This void 395 may be sized and shaped to accommodate the handle of a wheelchair 210. This enables the wheelchair 210 to sit closer to the vehicle seat 302 than would otherwise be possible. As shown in FIG. 7B, in one example this void 395 may be on front leg 365. Thus, when front leg 365 is in a void 162 in the seat base 310 sized and shaped to accommodate the front leg 365, the void 395 in front leg 365 may accommodate the handle of wheelchair 210. In other examples the void 395 may be directly in the underside of vehicle seat 302 separate from, in addition to, or instead of void 162.

As discussed above, with respect to vehicle seat 102, vehicle seat 302, 402, 413 may comprise a tray table 345 for use by a vehicle seat behind vehicle seat 302, 402, 413. The tray table 345 may be pivotably attached to a back of seat back 330 and pivot between a first stowed position and a second table position. In the stowed position, tray table 345 rests against seat back 330. In the table position, the tray table 345 acts as a table for a vehicle seat behind vehicle seat 302, 402, 413. While not shown, in FIGS. 5 to 9, vehicle seat 302, 402, 413 may comprise a baggage bar and/or an arm rest as described above.

While the above vehicle seats 102, 302, 402, 413 have been described with respect to a foldable seat base 110, 310, in another example, the seat base 110, 310 may be removable from vehicle seat 102, 302, 402, 413. In these examples instead of being pivotably attached to seat back 130, 330 or support structure 120, seat base 110, 310 is removeable attached to seat back 130, 330 or support structure 120. When the vehicle seat 102, 302, 402, 413 is being adapted for use by a wheelchair 200, 210, the seat base 110, 310 is removed from the seat back 130, 330 and stowed in an overhead locker or any other luggage or storage space.

As an alternative or in addition, front leg 165, baggage bar 160, and baggage side bar 164 when present may also be removeable from or with seat base 130, 310. If only one of front leg 165, side baggage bar 164 or baggage bar 160 are present, then only this may be removed. However, if more than one of front leg 165, baggage side bar 164 and baggage bar 160 are present they may all be removed instead of folded out the way or only one or two of them may be removed instead of folded. In one example, seat base 130, 310 may be foldable but front leg 165 and/or baggage bar 160 may be removed and stowed in a storage area. In another example, both front leg 165 and/or baggage bar 160 and seat base 130 may be removable and be removed when vehicle seat 102, 302, 402, 413 is being adapted to accommodate a wheelchair 200, 210. In this example, front leg 165, baggage side bar 164 and baggage bar 160 may be accommodated in voids 161, 162 in base of seat base 130 when being stowed to reduce the storage required. If only one or two of baggage side bar, 164, baggage bar 160 or front leg 165 are present then only one or two of the voids 161, 162 may be present.

The vehicle seats 102, 302, 402, 413 may be mounted or fixed in the vehicle using any suitable form of mounting or fixing structure. While vehicle seat 102 is shown with support structure 120, other structures are also possible. For example, the vehicle seat 102, 302, 402, 413 may be mounted to a side wall either directly or via another vehicle seat with no structure mounting the vehicle seat 102, 302, 402, 413 to the floor or plinth. Alternatively, an adjacent vehicle seat may be mounted to the floor and vehicle seat 102, 302, 402, 413 may be mounted or fixed to the adjacent seat.

Any of the above vehicle seats 102, 304, 404, 413 may further comprise or be used alongside a floor structure. The floor structure may be used to aid positioning or securing of a wheelchair 200, 210. Two possible floor structures are now described. Each of these floor structures may form part of or be used alongside any of vehicle seats 102, 304, 4040, 413.

Floor structure 510 is shown in FIGS. 6 and 7. Floor structure 510 sits on a floor or plinth of the vehicle beneath a vehicle seat. In Figurers 6 and 7 floor structure 510 is beneath vehicle seat 302. However, in other examples floor structure 510 could sit beneath any of the described vehicle seats. The floor structure 510 can be mounted to a floor or plinth of the vehicle. Floor structure 510 is positioned beneath vehicle seat 302 roughly in line with, below or otherwise aligned with seat back 330. Floor structure 510 comprises a front ramp 511 with a lowest edge of front ramp 511 positioned towards the front of vehicle seat 302. The front ramp 511 is dimensioned to provide a rest, stand or stop for a back wheel 211 of wheelchair 210. This enables the wheelchair 210 to be correctly positioned and limits movement of the wheelchair 210 once the wheelchair 210 has been correctly positioned. The floor structure 510 may comprise a back ramp where the back ramp 512 has a lowest edge positioned behind vehicle seat 302. This back ramp 512 may serve as a footrest for an occupant of a vehicle seat behind vehicle seat 302. This back ramp 512 may be smooth and/or sized and shaped to minimize the risk of an occupant in a vehicle seat behind vehicle seat 302 injuring themselves on ramp 510. The floor structure 510 shown in FIGS. 6 and 7 comprises two spokes that support front ramp 511 and back ramp 512. However, in other examples, the floor structure 510 may be solid or comprise more or less than two spokes.

Figure 10:
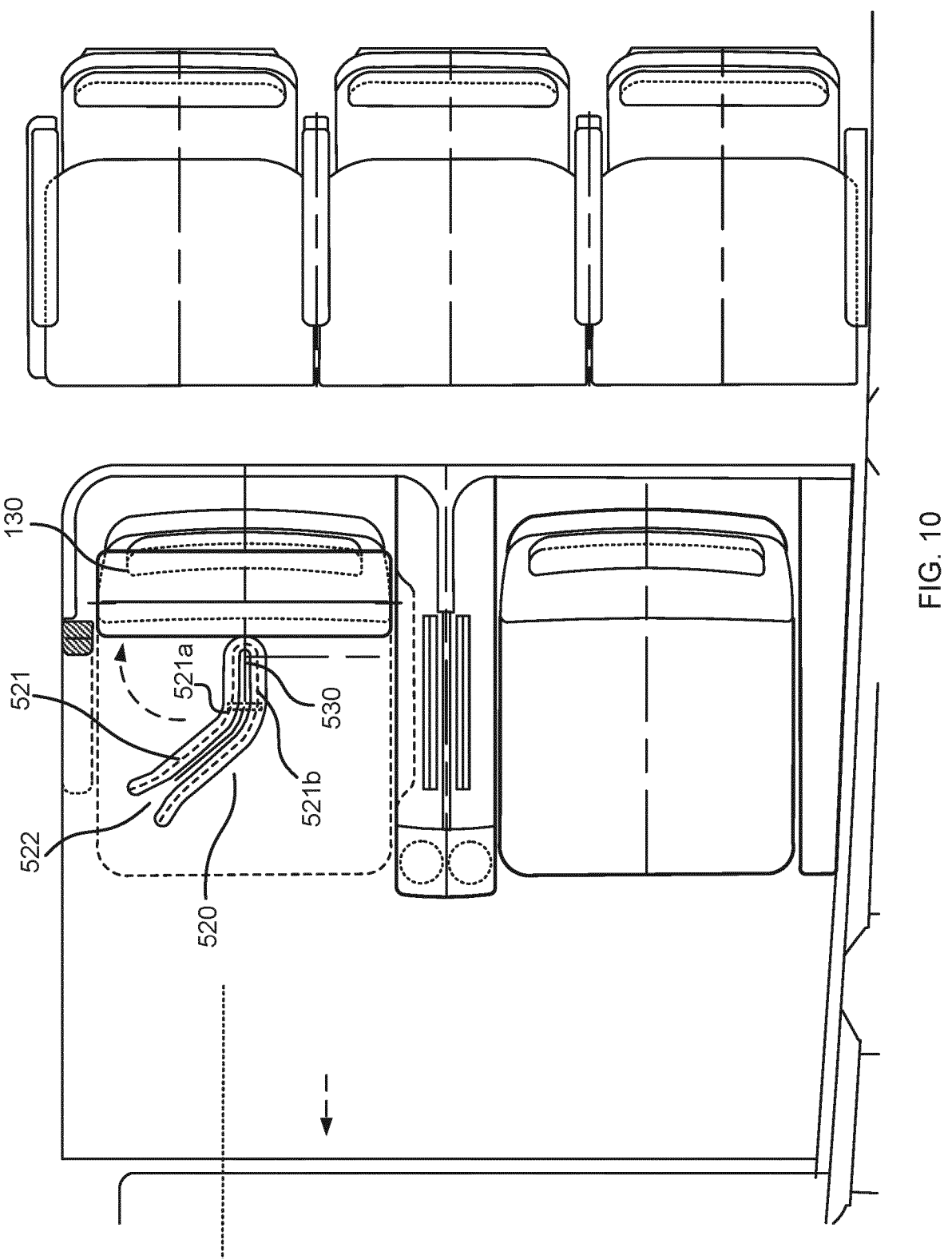
FIG. 10 shows a top view of vehicle seat with seat base stowed in order to illustrate a floor structure for locking a wheelchair in place.
Figure 11:
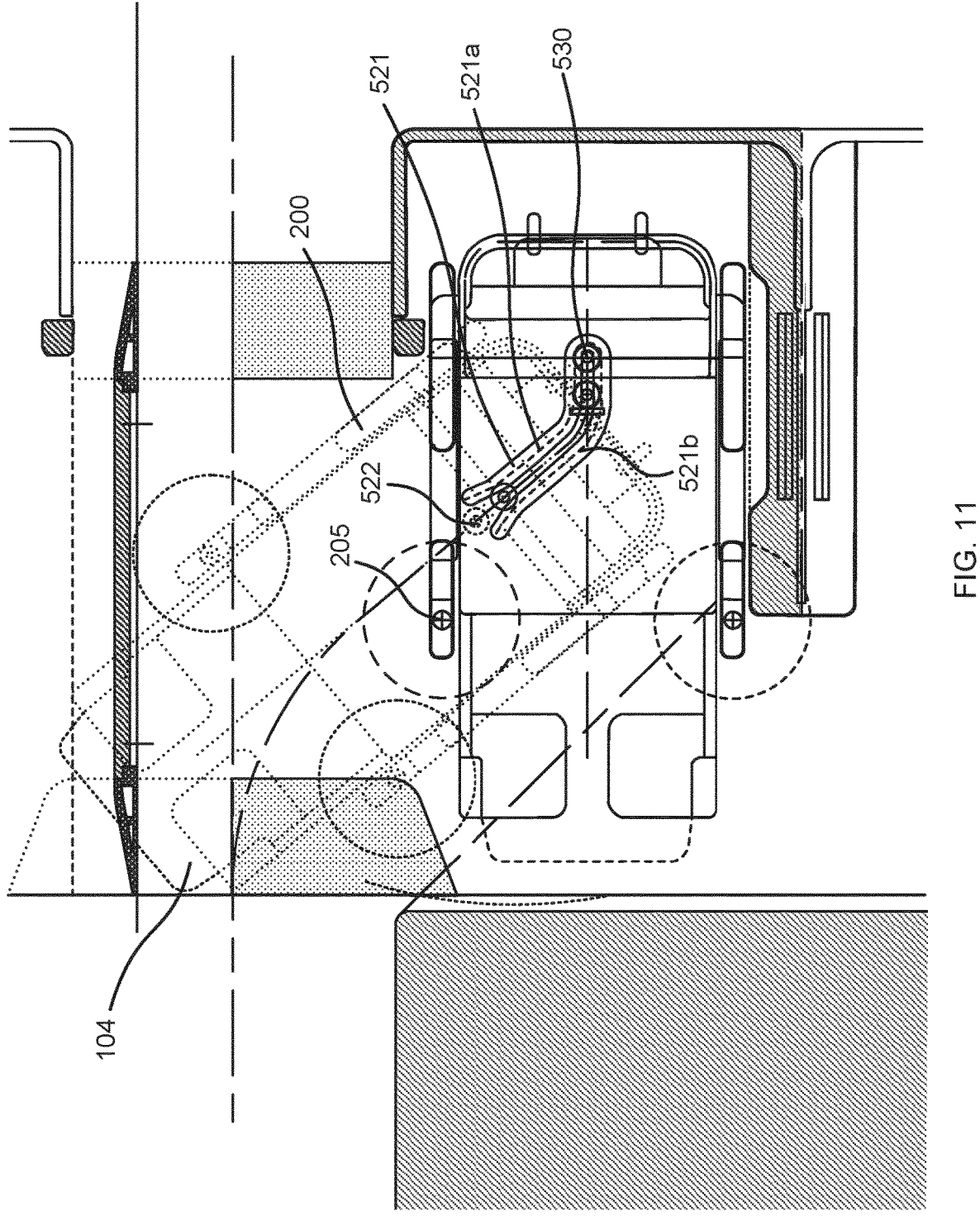
FIG. 11 shows a top view of vehicle seat with seat base stowed in order to illustrate a floor structure for locking a wheelchair in place and illustrate a wheelchair being positioned into floor structure.

An alternative floor structure 520 is shown in FIGS. 2 and 3 with respect to vehicle seat 102 and is shown in detail in FIGS. 10 and 11. While floor structure 520 is shown with respect to vehicle seat 102 it can be used with any of the described vehicle seats 102, 302, 402, 413. Floor structure 520 can also be called a floor guide. The floor structure 520 or floor guide 520 can be mounted to a floor or plinth of the vehicle. Floor structure 520 may sit beneath the vehicle seat 102 roughly central underneath vehicle seat 102. Floor guide 520 or floor structure 520 comprises a guiding structure 521 and a locking structure 530. The locking structure 530 may be configured to lock with a corresponding structure 205 on wheelchair 200. In one example corresponding locking structure 205 may be a pin or other extension extending vertically down from base of wheelchair 200. Locking structure 530 of floor structure or floor guide 520 may be a hole or other slot configured to enclose pin or extension 205 and securely and releasably hold pin or extension 205 in place. This enables the wheelchair to be securely attached to vehicle for safety reasons.

Guiding structure 521 may comprise two rails 521a, 521b or other form of raised guide. A gap between the two rails 521a, 521b may act as a guide to the pin or other extension 205 of wheelchair 200 to guide the pin/extension 205 towards locking structure 530 of the floor structure 520. Floor structure 520 may also comprise entrance 522. At entrance 522, the two rails 521a, 521b are spaced further apart compared to the rest of guiding structure 521 and may be angled towards each other to guide pin 205 into guide structure 521. As shown in FIGS. 10 and 11, entrance 522 of guiding structure 521 may face towards a front corner of vehicle seat 102. The guiding structure 521 may then extend diagonally backwards towards centre of vehicle seat 102. The guiding structure may then gently curve to a final part of guiding structure 521 which may extend straight backwards under vehicle seat 102 to locking structure 530.

When positioning a wheelchair 200, the wheelchair 200 is wheeled into place. The pin or extension 205 on wheelchair 200 may enter guiding structure 521 at entrance 522. The wheelchair may then be wheeled into position with the pin 205 remaining in guiding structure 521. This involves the wheelchair being wheeled first diagonally towards seat back 130 at which point pin 205 is in the diagonal section of guiding structure 521. The wheelchair may then be wheeled straight back towards seat back 130 at which point pin 205 is in straight section of guiding structure 521. The pin 205 may then lock with locking structure 530 holding the wheelchair 200 firmly in position. When the wheelchair 200 is being removed from the seat 102, it can be released from locking structure 530 and wheeled away from the vehicle seat 102 in reverse to how it was positioned.

Floor structure 520 thus serves not only to aid in positioning wheelchair 200 but also to secure wheelchair 200 within the vehicle thus increasing safety for a wheelchair occupant. It is noted that as shown in FIG. 11 when a plinth 104 is being used, plinth 104 may extend across the aisle of vehicle to enable easy access to wheelchair 200.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications including data and control messages between elements. The flow between elements may be in either direction or in both directions.

Where the description has explicitly disclosed in isolation some individual features, any apparent combination of two or more such features is considered also to be disclosed, to the extent that such features or combinations are apparent and capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A vehicle seat configured to be fixed in a vehicle, the seat comprising:
a seat back configured such that when the seat is fixed in the vehicle there is a gap between a lower edge of the seat back and a floor of the vehicle to enable wheels of a wheelchair to protrude through the gap;
a seat base wherein the seat base is either:
foldable between a first position in which the seat base acts as a base to the seat and a second position in which the seat base is stowed against the seat back; or
removable from the seat back; wherein
the seat base is foldable or removable to allow the seat base to be stowed when the seat is used by the wheelchair;
a first front leg which supports a first side of the seat base, wherein the first front leg is either foldable or removable to enable the first front leg to be stowed when the seat is used by the wheelchair; and
a first back leg which further supports the first side of the seat base, wherein there is no side support between the first front leg and the first back leg to enable unimpeded side access to the seat.

2. The vehicle seat of claim 1 wherein:
the seat base is foldable with respect to the seat back; and
when the seat base is in the second position, a lowest edge of the seat base sits above the lower edge of the seat back.

3. The vehicle seat of claim 1 further comprising:
a baggage bar which is either foldable or removable with the seat base to enable the baggage bar to be stowed when the seat is used by the wheelchair.

4. The vehicle seat of claim 3 further comprising:
a cut away region on an underside of the seat base wherein the cut away region is sized and shaped to accommodate the baggage bar.

5. The vehicle seat of claim 1 further comprising:
a floor guide configured to be fixed to a surface of the vehicle the floor guide comprising:
a first locking structure configured to securely hold a corresponding second locking structure on the wheelchair in place; and a guiding structure configured to guide the second locking structure so that the second locking structure locks with the first locking structure.

6. The vehicle seat of claim 1 further comprising:
a cut away region on an underside of the seat base wherein the cut away region is sized and shaped to accommodate part of a handle of the wheelchair.

7. The vehicle seat of claim 1 further comprising:
a cut away region on the seat back wherein the cut away region is sized and shaped to enable a first wheel of a large wheeled or self-propelled wheelchair to protrude through.

8. The vehicle seat of claim 7 further comprising:
a back piece slidably attached to the seat back wherein the back piece is slidable between a first position in which the back piece covers the cut away region and a second position in which the back piece is positioned above the cut away region.

9. The vehicle seat of claim 7 wherein:
the seat base is foldable with respect to the seat back; and
when the seat base is in the second position, a lowest edge of the seat base sits above the cut away region.

10. The vehicle seat of claim 7 wherein:
the cut away region is a first cut away region; and
the seat back has a second cut away region spaced apart from the first cut away region and sized and shaped to enable a second wheel of the large wheeled or self-propelled wheelchair to protrude through.

11. A pair of vehicle seats, each vehicle seat according to claim 7 wherein in use, a wheelchair is positioned between the pair of seats such that one wheel of the wheelchair passes through the cut away region in each seat back.

12. The vehicle seat of claim 1 further comprising:
a cut away region on an underside of the seat base wherein the cut away region is sized and shaped to accommodate the first front leg.

13. A vehicle seat configured to be fixed in a vehicle, the seat comprising:
a seat back configured such that when the seat is fixed in the vehicle there is a gap between a lower edge of the seat back and a floor of the vehicle to enable wheels of a wheelchair to protrude through the gap;
a seat base wherein the seat base is either:
foldable between a first position in which the seat base acts as a base to the seat and a second position in which the seat base is stowed against the seat back; or
removable from the seat back; wherein
the seat base is foldable or removable to allow the seat base to be stowed when the seat is used by the wheelchair; and
a wheel protector foldable between a first position in which the wheel protector is stowed against an underside of the seat base and a second position in which the wheel protector extends through the gap between the lower edge of the seat back and the surface of the vehicle to provide protection for the wheels of the wheelchair.

14. The vehicle seat of claim 13, wherein:
the seat base is foldable with respect to the seat back; and
when the seat base is in the second position, a lowest edge of the seat base sits above the lower edge of the seat back.

15. The vehicle seat of claim 13 further comprising:
a cut away region on an underside of the seat base wherein the cut away region is sized and shaped to accommodate part of a handle of the wheelchair.

16. The vehicle seat of claim 13 further comprising:

a cut away region on the seat back wherein the cut away region is sized and shaped to enable a first wheel of a large wheeled or self-propelled wheelchair to protrude through.

17. A vehicle seat configured to be fixed in a vehicle, the seat comprising:

a seat back configured such that when the seat is fixed in the vehicle there is a gap between a lower edge of the seat back and a floor of the vehicle to enable wheels of a wheelchair to protrude through the gap, the seat back having a removable cushion wherein removing the removable cushion from the seat back leaves a void in seat back which is sized and shaped to accommodate stowed seat base, and optionally wherein the removable cushion is foldable to allow easy storage; and a seat base wherein the seat base is either:

foldable between a first position in which the seat base acts as a base to the seat and a second position in which the seat base is stowed against the seat back; or removable from the seat back; wherein the seat base is foldable or removable to allow the seat base to be stowed when the seat is used by the wheelchair.

18. The vehicle seat of claim 17 wherein:

the seat base is foldable with respect to the seat back; and when the seat base is in the second position, a lowest edge of the seat base sits above the lower edge of the seat back.

19. The vehicle seat of claim 17 further comprising:

a baggage bar which is either foldable or removable with the seat base to enable the baggage bar to be stowed when the seat is used by the wheelchair.

20. The vehicle seat of claim 17 further comprising:

a cut away region on an underside of the seat base wherein the cut away region is sized and shaped to accommodate part of a handle of the wheelchair.

* * * * *